Patented Mar. 7, 1933

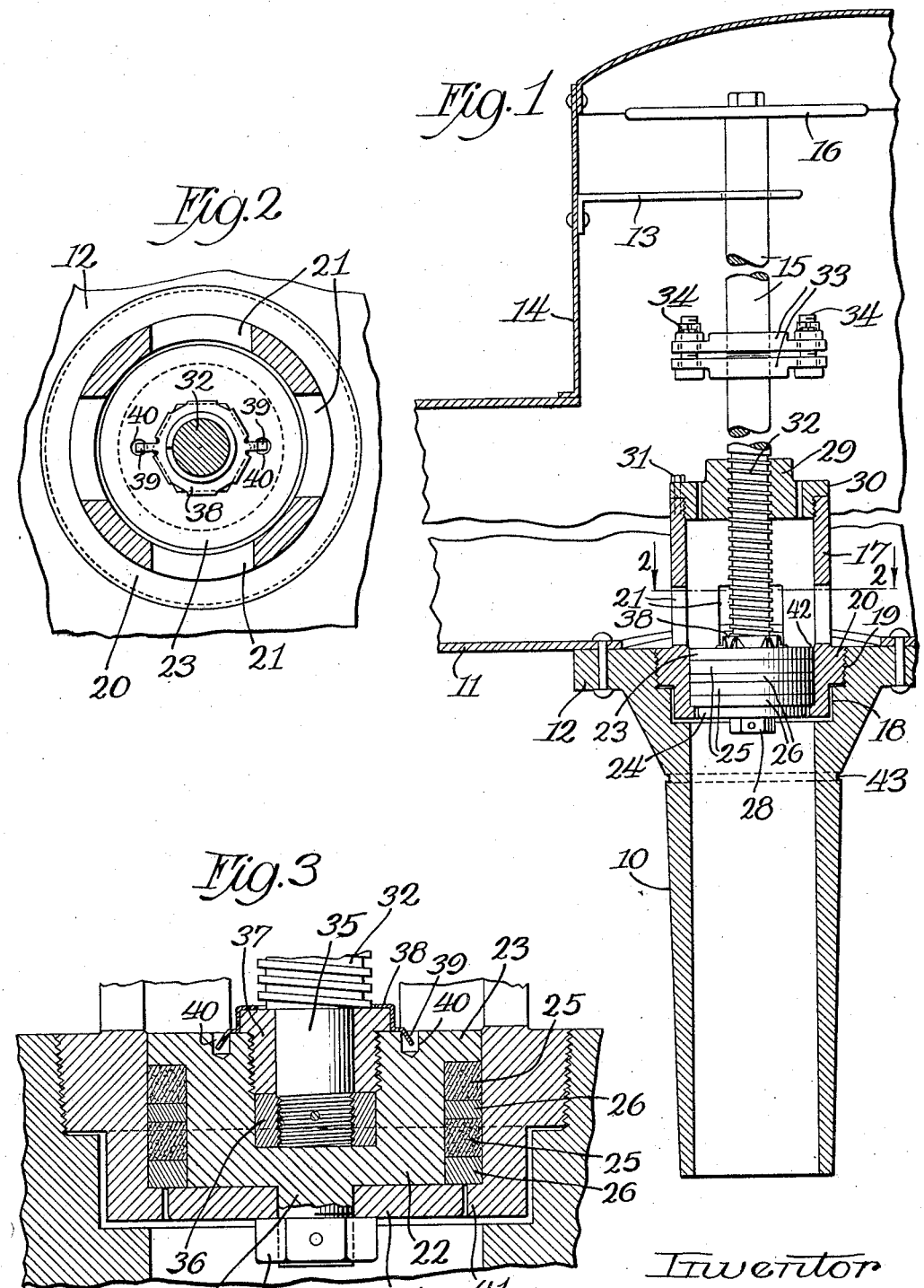

1,899,938

UNITED STATES PATENT OFFICE

CLARENCE O. BUENGER, OF CHICAGO, ILLINOIS, ASSIGNOR TO HILLS-McCANNA COMPANY, OF CHICAGO, ILLINOIS, A CORPORATION OF ILLINOIS

TANK CAR OUTLET VALVE

Application filed September 23, 1929. Serial No. 394,412.

The invention relates to tank car outlet valves and seeks to provide an improved, self-contained construction which can be readily installed in tank cars now in use, and in which the valve cannot be readily unseated in case of accidents or improperly manipulated from the exterior of the tank. A further object of the invention is to provide a construction having a packed piston valve which will effectively prevent leaking when closed and which is readily accessible for renewal of the packing.

The foregoing and other features of the invention are hereinafter more fully set forth, illustrated in the preferred form in the accompanying drawing, and more particularly pointed out in the appended claims.

In the drawing:

Fig. 1 is a vertical section of a portion of a tank car and of the improved outlet valve.

Fig. 2 is a horizontal section on the line 2—2 of Fig. 1.

Fig. 3 is an enlarged vertical section on the line 3—3 of Fig. 2.

As usual, in standard tank car construction, a depending outlet leg 10 is secured to the bottom 11 of the tank, the leg having a flange 12 which fits against the external surface of the tank bottom about the discharge opening therein and is secured in position by rivets extending through the flange. Also, as usual, a bracket 13 is arranged within the dome 14 of the tank and a rotatable valve rod 15 having a hand-wheel 16 at its upper end is guided by the bracket.

In the present improved construction, a cylindrical valve casing 17 is mounted within the tank upon the upper end of the leg with its lower end portion extending within a counterbore of the leg. Preferably, as shown, the counterbore at the upper end of the outlet leg is stepped and comprises a lower section 18 and an upper section 19 of larger diameter within which a projecting flange 20 on the valve casing is disposed, with the upper face of the flange in line with, or slightly below the upper face of the outlet leg. To secure the valve casing in position, the walls of the flange 20 and the counterbore section 19 are provided with interengaging screw threads, and to prevent the accidental unscrewing of the casing, these threaded walls are preferably slightly conical or tapered, and the flange 20 is screwed down tightly into the screw threaded portion of the counterbore so as to jam the screw threads and thus hold the casing against becoming unscrewed and loosened by the movements of the tank car and by the operations of unseating the valve. With this arrangement, the valve casing is securely held in position in the upper heavy flanged end of the outlet leg.

Above and closely adjacent the flange 20, the wall of the valve casing is provided with a series of outlet ports 21 and a piston valve, which slides within the casing, is arranged to fit the valve seating portion of the bore of the casing below the ports. This valve comprises a cylindrical body 22 having a flange 23 at its upper end, and packing and follower rings mounted on the valve body between the flange 23 and the projecting edge of a plate 24 on the lower end of the valve body. Preferably, as shown, there are two soft, compressible packing rings 25, and two solid metal follower rings 26, one disposed between the packing rings and the other engaged by the edge of the plate 24. The latter fits upon a projecting stud 27 on the lower face of the piston body and is secured in position by a nut 28 threaded on the stud.

A cap or bonnet 29 is removably mounted upon the upper end of the valve casing 17. In the form shown, the cap is externally threaded and engages internal screw threads in the upper edge portion of the valve casing, the cap having a flange 30 which abuts against the upper edge of the casing. Preferably, the cap is locked in position by a set-screw 31. An operating stem 32 is threaded through the cap 29 and is connected to the valve rod 15, preferably by a universal coupling. In the form shown, this coupling comprises two plates or collars 33 fixed to the adjacent ends respectively of the valve rod and stem and having projecting ears through which connecting bolts 34 loosely extend.

The lower end of the screw stem 32 is rotatably connected to the valve body 22. In the form shown, the stem is provided with a reduced lower end portion 35 which extends within a recess or bore in the valve body 22. A sleeve nut 36 is threaded upon and fixed to the extreme lower end of the reduced section 35 of the stem and rotatably fits within the lower portion of the recess in the valve body. A second sleeve nut threaded into the upper portion of the recess of the valve body engages the sleeve nut 36 and is provided with a cylindrical bore within which the upper portion of the reduced section 35 of the valve stem is rotatably fitted. Preferably, as shown, the upper end of the sleeve nut 37 is provided with a hexagonal flange, and a lock washer 38 bent over this flange is provided with ears 39 bent downwardly into small pockets 40 formed in the upper face of the valve body.

The valve casing is provided at its lower end below the valve seating portion with an inwardly projecting annular stop flange or shoulder 41 which engages the portion of the lower follower ring 26 that projects beyond the plate 24 to limit the closing movement of the valve, and this shoulder also, when the valve is forced to its closed position by means of the screw stem, cooperates with the follower rings to compress the soft packing rings 25. The latter are thereby axially compressed and radially expanded into firm engagement with the walls of the valve body and of the seating portion of the valve casing to prevent leaking. As the valve is opened, the pressure thus developed on the packing rings is reduced. To further reduce the pressure on the packing rings and permit the easy movement of the valve, the bore of the upper portion of the valve casing above the flange 20 is preferably relieved, that is its diameter is slightly greater than the diameter of the lower seating portion of the casing below the ports 24. However, the upper portion of the valve casing properly guides the movement of the valve and at its lower end, the internal wall is inclined inwardly, as indicated at 42, to properly guide the piston valve into the lower seating portion of the valve casing of slightly reduced diameter.

While, as stated, the shoulder 41 limits the closing movement of the valve, it does not do so until the soft packing rings are fully expanded into snug contact with the seating portion of the valve casing, since the seating portion is of such form that the metal body of the piston valve, including its flange 23, and the intermediate follower ring 26 are free to slide within the seat as the valve is closed. With this arrangement, the axial compression and radial expansion of the soft packing rings are not limited by the contact of the metal body of the piston valve with its seat, and the soft packing, even if somewhat worn, will be fully expanded to form a tight seal. It is also noted that the seal is not dependent upon the snug fit or contact of the metal parts of the piston valve with the valve seat, but instead is due to the effective engagement of the soft packing with the seat.

The improved valve construction is self-contained and can be readily applied to standard tank cars now in use. The outlet leg, as usual, is provided with a groove 43 adjacent its upper end, but below the thickened flanged portion thereof within which the valve casing is seated. This groove weakens the leg to provide a break point in case of accident and prevent the unseating of the valve. It is particularly noted that the threaded portions of the leg and valve casing are in line with the flange of the leg, so that the casing and its valve would not be disturbed even if the leg broke off above the groove 43. The valve can be readily manipulated and provides a tight seal to prevent leaking when closed. Also, the jamming of the conical threaded portions of the valve casing and leg, securely hold the casing against unscrewing, but by removing the cap 29, the screw stem and valve can be readily removed from the valve casing in case it becomes necessary to repack the valve.

It is also noted that the cylindrical valve body 22 is imperforate, the means for rotatably connecting the valve stem being arranged within a recess in the upper face of the valve body, and the plate 24 being removably held in position on a stud which projects from and is preferably integral with the lower portion of the valve body. This arrangement prevents leaking around the valve stem which is rotatably connected to the valve body and avoids the necessity of providing packing for the valve stem.

Changes may be made in the details set forth without departure from the scope of the appended claims.

I claim as my invention:

1. In a tank car outlet valve, the combination with a depending outlet leg, of a valve casing secured to and extending within the upper portion of said leg, said casing having ports in its side walls adjacent and above the upper end of said leg and having its bore below said port forming a substantially cylindrical valve seat, a sliding piston valve comprising an imperforate, substantially cylindrical body portion having a flange at its upper end, freely slidable within said seat and provided with soft packing and a follower ring mounted thereon below said flange, said casing having an inwardly projecting shoulder below said valve seat for engaging the follower ring to axially compress and radially expand the soft packing as the valve is closed, and a threaded valve stem rotatably connected to the upper portion of said valve body, substantially as described.

2. In a tank car outlet valve, the combination with a depending outlet leg, of a cylindrical valve casing secured to and extending within the upper portion of said leg, said casing having ports in its side wall adjacent and above the upper end of said leg and having its bore below said ports slightly reduced in diameter to provide a substantially cylindrical valve seat, a sliding piston valve guided within the upper and lower portions of said valve casing and comprising a substantially cylindrical body freely movable within said seat and provided with soft packing and a follower ring mounted thereon, said casing having a shoulder below said seat for engaging the follower ring to thereby expand the soft packing as the valve is closed, and a valve stem threaded through the upper portion of the valve casing and rotatably connected to the valve body, substantially as described.

3. In a tank car, a depending outlet leg having a flange at its upper end secured to the tank and also having a threaded counterbore at its upper end, a valve casing having a projecting flange at its lower end threaded within the counterbore of said leg and disposed substantially in alignment with the flange of said leg, said casing having ports in its wall above and adjacent its flange, a piston valve slidably guided within the bore of said casing and within a seating portion below said ports, soft packing and a follower ring mounted on the body of the piston valve, an operating screw stem rotatably connected to the valve body, and means engaging the follower ring to compress and expand the soft packing when the valve is closed, substantially as described.

4. In a tank car outlet valve, a depending outlet leg secured to the tank and having a counterbore at its upper end, a valve casing having a projecting flange at its lower end disposed in the counterbore of the leg, the walls of the counterbore and flange having interengaging conical threaded walls to permit jamming of the threads for holding the casing against accidental unscrewing, and said casing having ports in its walls adjacent and above said flange, a piston valve provided with soft packing fitting the seating portion of the bore of said casing below said ports, and operating means rotatably connected to said valve, the valve and operating means being removable from the casing without detaching the latter from the outlet leg, substantially as described.

5. In a tank car outlet valve, a depending outlet leg secured to the tank, a valve casing secured to and extending within the upper portion of said leg, and having ports in its walls adjacent and above the upper end of the leg, a piston valve slidable within the seating portion of the bore of the casing below the ports, said valve comprising a cylindrical, imperforated body having a flange at its upper end, a plate secured to the lower end of the body, and soft packing and a follower ring mounted on the cylindrical valve body between said flange and the edge portion of said plate, and an operating screw stem threaded through the upper portion of the valve casing and rotatably connected to the valve body, the valve casing having an internal shoulder at its lower end for engaging the follower ring and compressing the soft packing when the valve is closed, substantially as described.

6. An outlet valve for tank cars and the like, comprising a valve casing and a piston valve slidable in said casing and comprising a cylindrical imperforate body having a projecting flange at its upper end and a stud projecting from its lower face, a plate removably mounted on said stud and projecting beyond the periphery of the valve body, soft packing and solid, metal follower rings mounted on the cylindrical valve body with a packing ring engaging said flange and a follower ring engaging said plate and projecting beyond the edge thereof, said casing having a shoulder for engaging the projecting portion of said follower ring to compress the soft packing ring or rings when the valve is closed, substantially as described.

7. In a tank car outlet valve, the combination with a depending outlet leg, of a substantially cylindrical valve casing secured to and extending within the upper portion of said leg, said casing having ports in its side wall adjacent and above the upper end of said leg and having the portion of its bore below said ports slightly reduced in diameter to provide a valve seat, a piston valve slidably guided within the upper and lower portions of the bore of the valve casing, soft packing and a follower ring mounted on the body of the piston valve, and an operating screw stem rotatably connected to the valve body, the valve body and follower ring being of smaller diameter than the corresponding portions of the valve seat, and said casing having means engaging the follower ring to compress and expand the soft packing into snug engagement with the valve seat when the valve is closed, substantially as described.

CLARENCE O. BUENGER.